US008412735B2

(12) United States Patent
Yeh et al.

(10) Patent No.: US 8,412,735 B2
(45) Date of Patent: Apr. 2, 2013

(54) DATA QUALITY ENHANCEMENT FOR SMART GRID APPLICATIONS

(75) Inventors: Peter Zei-Chan Yeh, San Jose, CA (US); Sanjay Mathur, Sunnyvale, CA (US); Scott W. Kurth, Arlington Heights, IL (US); John Mills Akred, San Jose, CA (US); Erin Jennifer Maneri, San Jose, CA (US); John Y. Miller, Toronto (CA)

(73) Assignee: Accenture Global Services Limited, Dublin (IE)

( * ) Notice: Subject to any disclaimer, the term of this patent is extended or adjusted under 35 U.S.C. 154(b) by 284 days.

(21) Appl. No.: 12/767,354

(22) Filed: Apr. 26, 2010

(65) Prior Publication Data
US 2011/0137876 A1 Jun. 9, 2011

Related U.S. Application Data

(60) Provisional application No. 61/267,338, filed on Dec. 7, 2009.

(51) Int. Cl.
*G06F 17/30* (2006.01)
*G06F 17/00* (2006.01)

(52) U.S. Cl. ............ 707/776; 707/797; 706/47; 706/59
(58) Field of Classification Search .................. 707/797, 707/776; 706/47, 59
See application file for complete search history.

(56) References Cited

U.S. PATENT DOCUMENTS

| 7,315,825 | B2 * | 1/2008 | Rosenfeld et al. | 705/2 |
|---|---|---|---|---|
| 7,836,004 | B2 * | 11/2010 | Roth et al. | 706/47 |
| 2009/0006302 | A1 | 1/2009 | Fan et al. | |
| 2009/0271358 | A1 * | 10/2009 | Lindahl et al. | 706/51 |
| 2009/0287721 | A1 | 11/2009 | Golab et al. | |
| 2010/0138363 | A1 * | 6/2010 | Batterberry et al. | 705/412 |

OTHER PUBLICATIONS

"Discovering Conditional Functional Dependencies", Fan, et al., IEEE International Conference on Data Engineering2009 ICDE 09. 25th International Conference Piscataway, NJ, USA Mar. 9, 2009.
"Improving the Data Quality of Relational Databases using OBDA and OWL 2 QL", Oliver CURE www.webont.org/owled/2009.
"Conditional Functional Dependencies for Data Cleaning", Bohannon, et al. Data Engineering, 2007 Apr. 1, 2007.
"Data Quality Enhancement of Databases Using Ontologies and Inductive Reasoning", Nov. 25, 2007 Cure, et al.
"Rule Mining for Automatic Ontology Based Data Cleaning", Apr. 26, 2008 Stefan Bruggemann, OFF-Institute for Information Technology Escherweg 2, 26121 Oldenburg, Germany.

* cited by examiner

*Primary Examiner* — Yicun Wu

(57) ABSTRACT

A method, in one embodiment, can include encoding knowledge about a topic domain into a data modeling technique. Additionally, a set of candidate conditional functional dependencies can be generated based on a data set of the topic domain. Moreover, the set of candidate conditional functional dependencies and the data modeling technique encoded with the topic domain knowledge can be applied to the data set to obtain a plurality of data quality rules for the data set.

20 Claims, 11 Drawing Sheets

DATA QUALITY ENHANCEMENT FOR SMART GRID APPLICATIONS

CROSS-REFERENCE TO RELATED APPLICATIONS

This patent application claims the benefit of the U.S. Provisional Patent Application No. 61/267,338 entitled "Method and System for Accelerated Data Quality Enhancement", by Peter Zei-Chan YEH et al., filed Dec. 7, 2009, which is hereby incorporated by reference in its entirety.

BACKGROUND

Modern society is characterized by an increasing reliance on the accuracy of a rapidly expanding storehouse of data. At the same time, the accuracy of this data is of increasing importance for the functioning of modern enterprises, such as electricity utilities that operate smart grids. It is noted that data can become corrupted due to human error as it is entered into a system by hand, or as it is inaccurately detected by smart grid sensors. As such, when the smart grid data contains errors, the electricity utilities may have difficulty accurately identifying theft of electricity, may have difficulty accurately capturing historical load variation and capacity utilization, and may have difficulty accurately determining which premises are connected to which equipment identified as outage source.

There are different conventional techniques for finding and correcting errors within data. For example, automated rule development techniques include mining data to form association rules and mining data for conditional functional dependencies (CFDs). However, there is a general consensus in the field that association rules are inadequate for addressing data quality problems in large databases. The process of mining data for CFDs is emerging as a more promising approach to automated data quality detection and correction.

It is pointed out that CFDs are rules that enforce patterns of semantically related constants within the data. FIG. 1 provides an example of a simple CFD. In this case, the input data points 101 and 102 have three attributes which are a country code (CC), a state (S), and an area code (AC). A data set made up of such data points could be part of a database keeping track of the locations of an enterprise's customers. CFD 100 checks data based on the fact that if a country code is 01 for the United States, and an area code is 408, then the accompanying state should be California. Applying data input 101 to CFD 100 will result in a passing output value 103. Whereas applying data input 102 to CFD 100 will result in a failing output value 104.

There are two main drawbacks to the approach of automating the discovery of CFDs. The first is that the number of CFDs that could possibly be applied to a data set increases exponentially with an increase in the number of attributes in the data set. This results in a nearly prohibitive increase in the complexity of such a technique. In the example above, with a relatively simple set of three values there could still be 12 functional dependencies. The number of possible CFDs would greatly exceed that number multiplied by the more than 270 area codes in service in the United States. Current automated discovery techniques are also unable to handle noisy data.

SUMMARY

A method, in one embodiment, can include encoding knowledge about a topic domain into a data modeling technique. Additionally, a set of candidate conditional functional dependencies can be generated based on a data set of the topic domain. Moreover, the set of candidate conditional functional dependencies and the data modeling technique encoded with the topic domain knowledge can be applied to the data set to obtain a plurality of data quality rules for the data set.

While a particular embodiment in accordance with the invention has been specifically described within this Summary, it is noted that the invention and the claimed subject matter are not limited in any way by this embodiment.

BRIEF DESCRIPTION OF THE DRAWINGS

The accompanying drawings, which are incorporated in and form a part of this specification and in which like numerals depict like elements, are included for exemplary illustration of principles of the present embodiments and are not intended to limit the invention to the particular implementations illustrated therein. The drawings referred to in this description should not be understood as being drawn to scale except if specifically noted.

DETAILED DESCRIPTION

Figure 1:
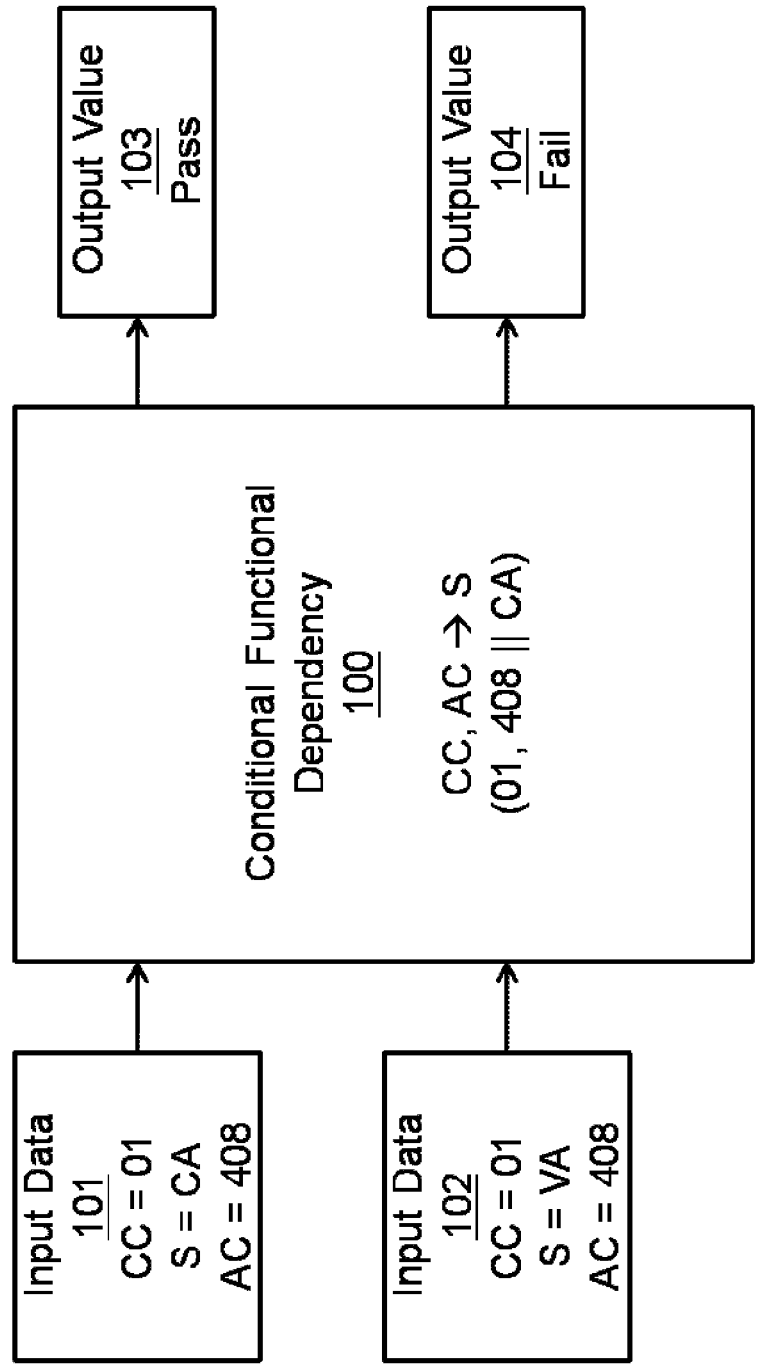
FIG. 1 is a block diagram of a conditional functional dependency operating on input data.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities can take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "encoding", "generating", "applying", "performing", "aggregating", "receiving," "gathering", "retrieving", "incorporating", "producing", "enabling," "sending," "determining," "accessing," "allowing," "updating," or the like, can refer to actions and processes of a computer system or similar electronic computing device or processor. The computer system or similar electronic computing device can manipulate and transform data represented as physical (electronic) quantities within the computer system memories, registers or other such information storage, transmission or display devices.

Various embodiments in accordance with the invention can solve the technical problem of identifying, collecting, and managing rules that improve poor quality data on enterprise initiatives ranging from data governance to business intelligence. Various embodiments in accordance with the invention can also significantly reduce the amount of manual effort required to collect data quality rules on enterprise initiatives such as master data management, business intelligence, and others. Moreover, various embodiments in accordance with the invention can also supports other business needs such as ensuring that one's data conforms to predefined business logic.

Various embodiments in accordance with the invention can solve the problems described above by automatically discovering actionable data quality rules and by providing an intuitive rule browser to manage these rules. Various embodiments in accordance with the invention do not suffer from the computational complexity of conventional methods and are capable of dealing with noisy data. Finally, various embodiments in accordance with the invention can provide data quality enhancement rules to specific client data cleanliness issues without the need for costly access to, and assimilation of SME knowledge of data characteristics.

Figure 2:
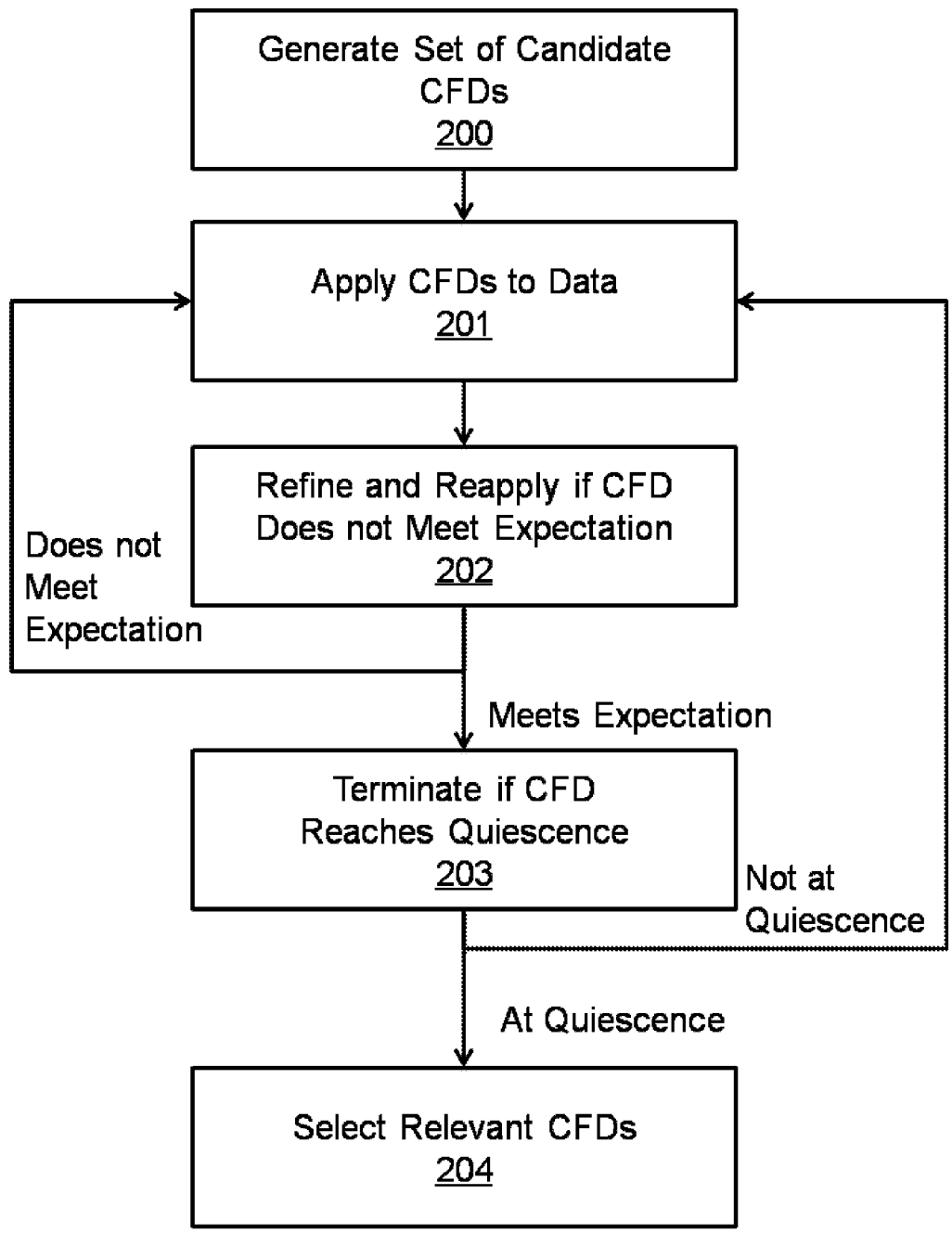
FIG. 2 is a flow diagram of a method in accordance with various embodiments of the invention.

FIG. 2 is a flow diagram of a method 205 in accordance with various embodiments of the invention for producing data quality rules for a data set. Although specific operations are disclosed in flow diagram 205, such operations are examples. Method 205 may not include all of the operations illustrated by FIG. 2. Also, method 205 may include various other operations and/or variations of the operations shown by FIG. 2. Likewise, the sequence of the operations of flow diagram 205 can be modified. It is appreciated that not all of the operations in flow diagram 205 may be performed. In various embodiments, one or more of the operations of method 205 can be performed by software, by firmware, by hardware or by any combination thereof, but is not limited to such. Method 205 can include processes of embodiments of the invention which can be carried out by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Before the method 205 begins, it is assumed in one embodiment that an ontology of the data set is available which indicates which attributes in the data set are related. To use the previously discussed example, area code and state would be directly related, whereas a different variable such as a customer's first name may not be related to area code at all. At operation 200, a set of candidate CFDs is generated. The candidate CFDs are based on a set of candidate seeds that are subsets of all the attributes in the data set. In keeping with the previous example, a candidate seed could be a combination of the country code and the area code. The attributes selected for the candidate seeds would have a certain degree of separation in the ontology of the data set. For example, attributes that are within three links in the ontology could be selected as groups of attributes for the candidate seeds.

In specific embodiments of the invention, the number of candidate CFDs, the number of conditions in each CFD, and the number of attributes in each CFD is determined by a user prior to beginning to practice the invention. The number of conditions in a CFD determines how many constraints are placed on the attributes that form the CFD. In keeping with our example, the rule "if area code is 408; then state must be California" would count as a single condition. All three of these variables would have a direct impact on the time it would take for the automated portion of the method to execute. Selecting a lower number for any of these values would trade-off the overall efficiency of the resultant set of data enhancement rules for a faster convergence of the candidate CFDs.

At operation 201 of FIG. 2, the candidate CFDs would be applied individually to data in the data set. In a specific embodiment of the invention, this applying would be done in data segments having a predetermined length. For example, the CFDs could be applied to a data segment having a length of one-thousand data points. Embodiments that took this approach would save a significant amount of time because it would take less time to apply the rules to a data segment as compared to the entire data set.

In a specific embodiment of the invention, the size of the data segment would be set by a scan period that was determined by a user. The purpose of applying the CFDs to the data would be to obtain a set of corresponding result values for each of the CFDs. The set of corresponding result values would generally be equivalent in size to the number of data points said CFDs were applied to. In another specific embodiment of the invention, the set of result values would indicate if the rule matched the data point, if the rule did not match but did not conflict with the data point, and if the rule conflicted with the data point.

At operation 202 of FIG. 2, the candidate CFDs are refined individually if they have a result signature that does not meet a predetermined expectation. In a specific embodiment, the result signature would be a list of the result values that came about from applying the individual CFDs to the data. The refining of the individual candidate CFDs would be done such that they would more closely meet the predetermined expectation if reapplied to the data.

In a specific embodiment of the invention, the refining could be achieved through the elimination of a high entropy attribute from the candidate CFD. The highest entropy attribute would be the attribute in the candidate CFD that took on the most values throughout the data set. Selecting this attribute for elimination would be effective in refining the candidate CFD because it would statistically be the best attribute to eliminate in order to make the candidate CFD less restrictive. In the example discussed above with three attributes, this would most likely result in the elimination of the area code attribute in any candidate CFD that did not meet the predetermined expectation.

In a specific embodiment of the invention, the predetermined expectation would be set by a coverage estimate and a predetermined error estimate. The coverage estimate would be an estimate of how many different data points the candidate CFD would apply to, meaning that the attributes and values on which the candidate CFD operated on were present in the data point. For example, a candidate CFD with the condition "if area code is 408; then state must be California" would cover any data point where the area code attribute was 408. The error estimate would be an estimate of how many different data points would fail a candidate CFD that expressed a desired relationship in the data. For example, an SME might provide the information that 5% of the area codes in a database were probably incorrect, and that such errors were random. In that case, the error estimate would be 5%, and a data point with an area code of 408 and a state besides California would count as one data point towards the total error content of the result signature. If there were five errors in a result signature for a one-hundred data point data segment, then the error estimate would match exactly. It is noted that various embodiments that utilize error estimates will be able to handle noisy data because they take account of potential errors. Without taking an error estimate into account, a result value that indicated the rule didn't fit would not carry any information regarding whether the rule was erroneous. In another specific embodiment of the invention, the coverage estimate and error estimate could be adjusted by a user.

At operation 203 of FIG. 2, the applying and refining of the candidate CFDs terminates when the candidate CFD has reached a quiescent state. The benefit of such an approach is that unnecessary processing is prevented because rules that have been proven valid are not continuously applied. In addition, not all of the data in a finite data set needs to be examined, only enough to formulate stable rules. In a specific embodiment of the invention, a quiescent state is defined as the point when a candidate CFD has been applied without refinement to a series of data points that contain stable data. Data stability can be determined either by reference to the swing of the values of particular attributes relative to a known variance, or it could be set by tolerances obtained from a SME. The number of data points in the aforementioned series could be set by a window period value, and in another specific embodiment of the invention the window period could be adjusted by a user. Since this window period and the data segments at operation 201 are of different sizes, there may be a lag time between when operation 202 produces a meets-expectation-result, and when operation 203 executes and determines if a CFD under test has reached quiescence.

In various embodiments of the invention, different candidate CFDs could be at different places within FIG. 2. Some candidate CFDs could reach quiescence rapidly and be ready to move on to operation 204, while others are still circling back through operation 201. As mentioned before, this approach would save precious computing time because CFDs that had already converged would not be reapplied to the data.

At operation 204 of FIG. 2, a relevant set of said candidate CFDs is selected. The relevant set of candidate CFDs will be the data quality rules for the data set. Relevance is determined mainly by the level of coverage of any specific candidate CFD. Coverage, was described above, and refers to how many data points a candidate CFD applies to. In a specific embodiment of the invention, relevance would also be set by a goodness of fit statistical analysis of the stable candidate CFDs. The goodness of fit analysis for relevance would include a detected error rate and a degree of coverage for the CFDs. The most relevant CFDs under the goodness of fit analysis would be those with the highest level of coverage, and a minimum proximity between their detected error rates and the estimated error rate.

In a specific embodiment of the invention, the data quality rules could be sorted automatically. This can be desirable because in many complex situations the number of stable candidate CFDs can be very high and their analysis can be time consuming. For example, the candidate CFDs in the relevant set could be ranked according to an interestingness factor. The ranking would be done so that a person evaluation the relevant CFDs would be aided in directing their attention. The interestingness factor would increase as the portion of a data set containing one of the values on which the candidate CFD was based decreased. Using the example discussed above, if there were a thousand data points with the value 408 for the area code attribute in a data set, and 4 data points with the value 212 for the area code in the data set, then a candidate CFD which was based on the area code equaling 212 would have a higher value for the interestingness factor. In another specific embodiment of the invention, the data quality rules could be grouped together into subsets of rules that addressed similar data quality problems. In a still further embodiment statistics such as connections between rules, conflicts between rules, and percentage of data covered by each rule could be provided along with the rules.

In another embodiment of the invention, a method for enhancing data quality is provided. The method would proceed in much the same way as described in reference to FIG. 2. However, the relevant set of candidate CFDs produced by the process would be applied to enhance the data quality of a data set. The candidate CFDs, which at this point would be the data enhancement rules, would be applied to all of the data in the data set. Data points that did not align with the data enhancement rules would either be flagged for later attention or could be deleted or modified to a best guess of their proper value, thereby enhancing the data quality of the data set.

The data enhancement rules generated in accordance with the invention could also be applied in embodiments of the invention to enhance the data quality of a related group of data sets. The rules could be applied to any number of data sets with similar content, meaning that the data in the related data sets had a characteristic similar to that of the original data set on which the method determined the data quality rules. This process could be adapted for data sets that were stored externally by exporting the relevant rules to a data quality product or an external database management system. In particular, the data quality products to which the rules could be exported could be TS Discovery, Informatica, Trillium, IDE/IDQ and Oracle Data Integrator.

Figure 3:
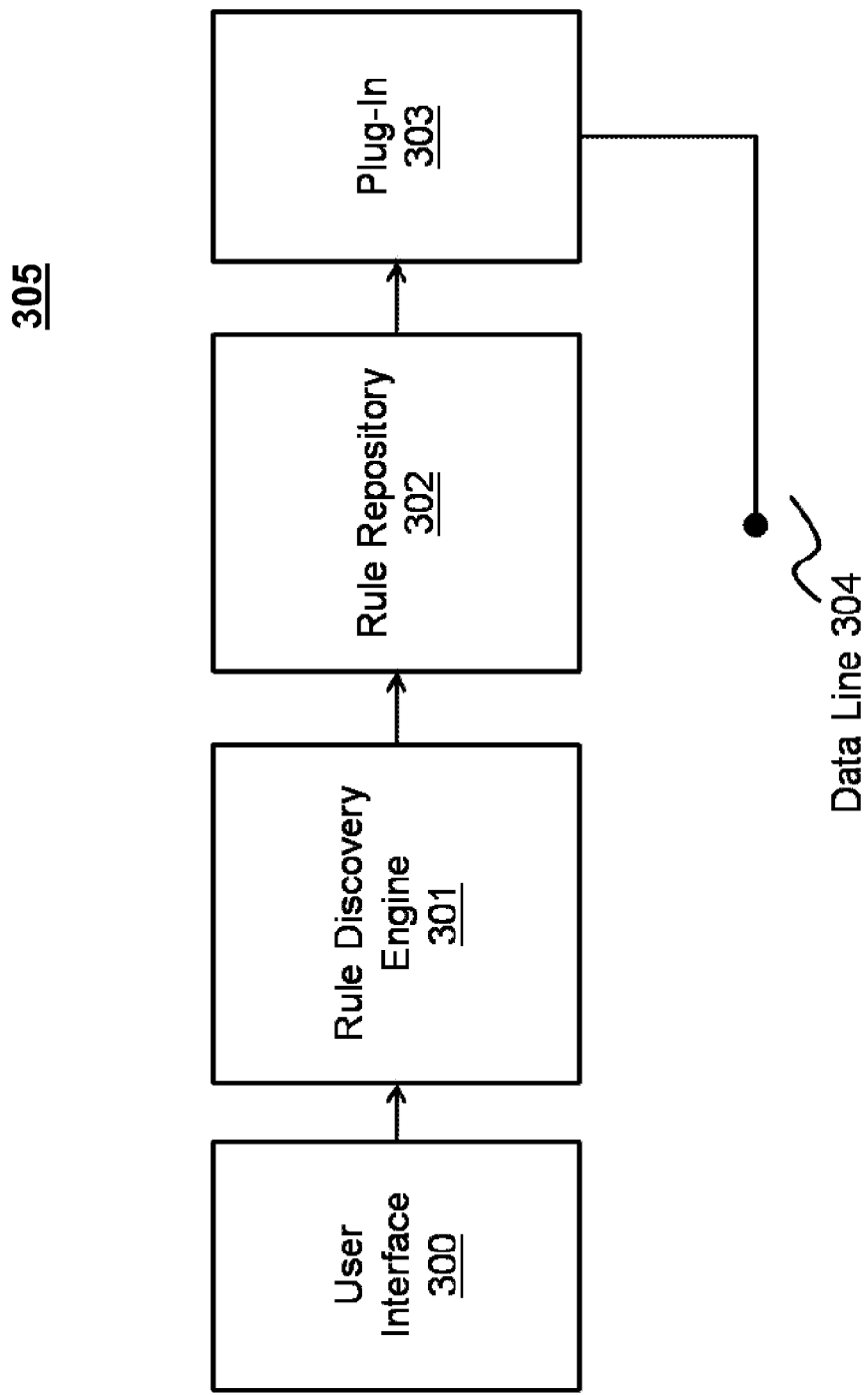
FIG. 3 is a block diagram of a system for producing data quality rules for a data set in accordance with various embodiments of the invention.

FIG. 3 displays a computer system 305 for the development of data quality rules in accordance with various embodiments of the invention. Rule repository 302 is used for storing data quality rules. In a specific embodiment of the invention, rule repository 302 is capable of delivering the rules to a plug in data-exchanger such as plug-in 303. Plug-in 303 can be added to the system which allows exporting the data rules to another system in a compatible fashion. In one embodiment, plug-in 303 would be comprised of a set of plug-ins that each assured compatibility with a different external system. Such an embodiment would be desirable because the rules can then be adapted to be applied to any number of external systems along data line 304. The external systems capable of receiving the data quality rules could be a system running a data quality product, an external data base management system, or any other system to which data quality rules may be applied. In particular, the external system could be one running a data quality product such as, but not limited to, TS Discovery, Informatica, Trillium, IDE/IDQ and Oracle Data Integrator.

Rule repository 302 obtains the data quality rules from data quality rules discovery engine 301. The data quality rules discovery engine 301 is capable of receiving a data set, an ontology of the data set, and a set of rule generation parameters from user interface 300. User interface 300 is also capable of outputting the data quality rules that are discovered by data quality rules discovery engine 301 for external use. Data quality rules discovery engine 301 forms a set of candidate CFDs based on the ontology of the data set and refines those rules iteratively based on observation of how the rules function when applied to the data. Data quality rules discovery engine 301 terminates the iterative refining process when the candidate CFDs reach a quiescent state and become data quality rules.

In a specific embodiment, a user interface, such as user interface 300, could further comprise a graphical user interface (GUI). In a specific embodiment of the invention, such a GUI could be capable of receiving rule generation parameters, an address of a data set, an address of related data sets, and an address of an ontology from a user. The rule generation parameters could also be adjusted by a user through the use of the GUI. Finally, the GUI could also be capable of displaying the rules that were generated by the rule discovery engine to the user such that the user could double check and optionally revise the displayed rules. The rules could also be displayed by the GUI with information regarding the rules such as the portion of the data that the rule applied to and the detected error rate of the data when applied to the rule.

It is noted that the computer system 305 may not include all of the elements illustrated by FIG. 3. Additionally, the computer system 305 can be implemented to include one or more elements not illustrated by FIG. 3. It is pointed out that the computer system 305 can be utilized or implemented in any manner similar to that described herein, but is not limited to such.

Figure 4:
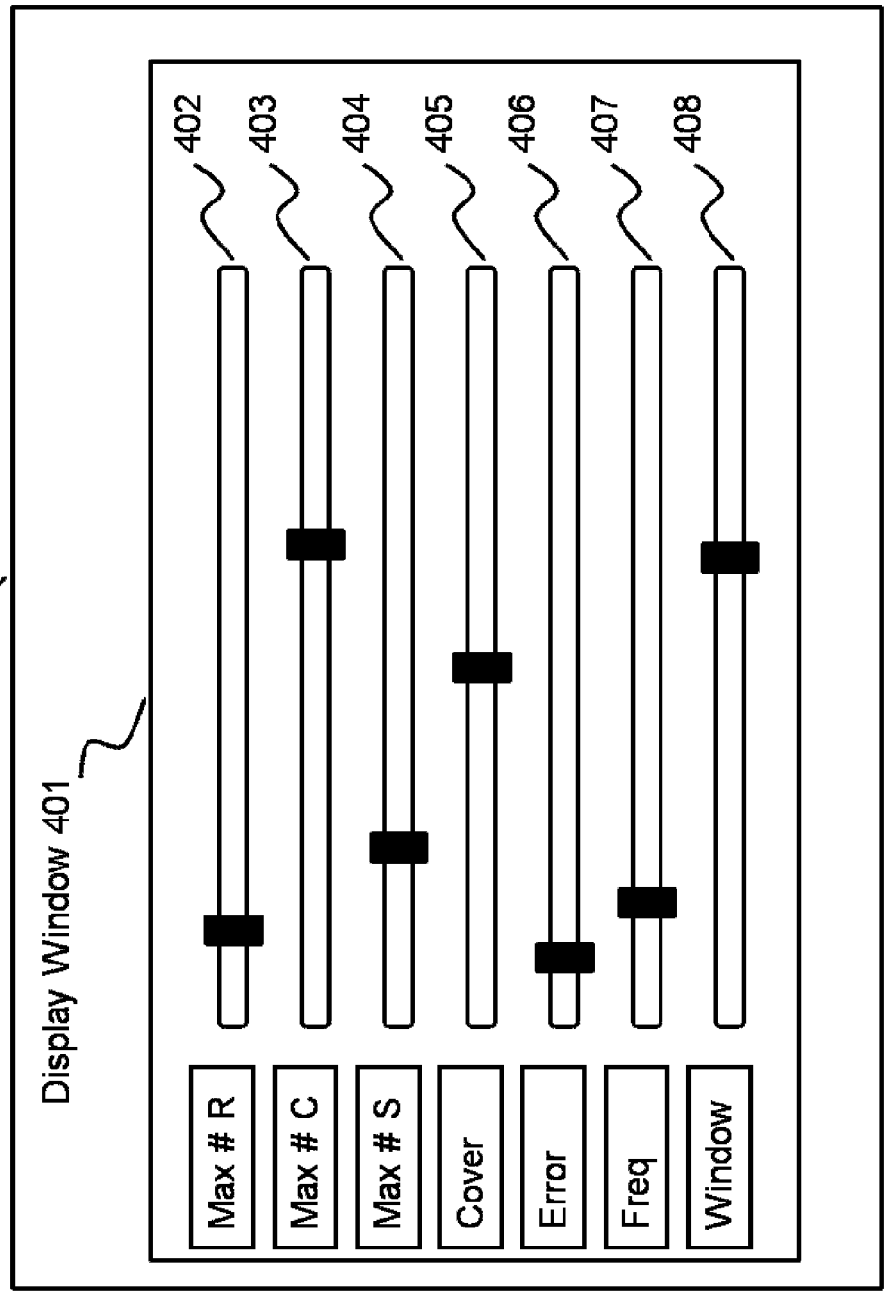
FIG. 4 illustrates a graphical user interface data input in accordance with various embodiments of the invention.

FIG. 4 displays an example of an input display of a GUI 400 in accordance with various embodiments of the invention. GUI 400 is capable of displaying information to and receiving information from a user. Display window 401 contains several selectors. In a specific embodiment the selectors could include a max number-of-rules selector 402 capable of accepting and setting the number of candidate CFDs, a max number of conditions selector 403 capable of accepting and setting the maximum number of conditions in each of the candidate CFDs, a max number of seeds selector 404 capable of accepting and setting the maximum number of candidate seeds in each of the candidate CFDs, a coverage selector 405 capable of accepting and setting the desired coverage of any particular CFD as applied to the data set, an error rate selector 406 capable of accepting and setting the expected error rate of any particular CFD as applied to the data set, a frequency selector 407 capable of accepting and setting the scan period for each application of any particular CFD to the data set, and a window size selector 408 capable of accepting and setting the amount of data that needs to be evaluated before the rules will be evaluated for quiescence. Values selected by the selectors can be submitted to data quality rules discovery engine 301.

It is noted that the GUI 400 may not include all of the elements illustrated by FIG. 4. Furthermore, the GUI 400 can be implemented to include one or more elements not illustrated by FIG. 4. It is pointed out that the GUI 400 can be utilized or implemented in any manner similar to that described herein, but is not limited to such.

Figure 5:
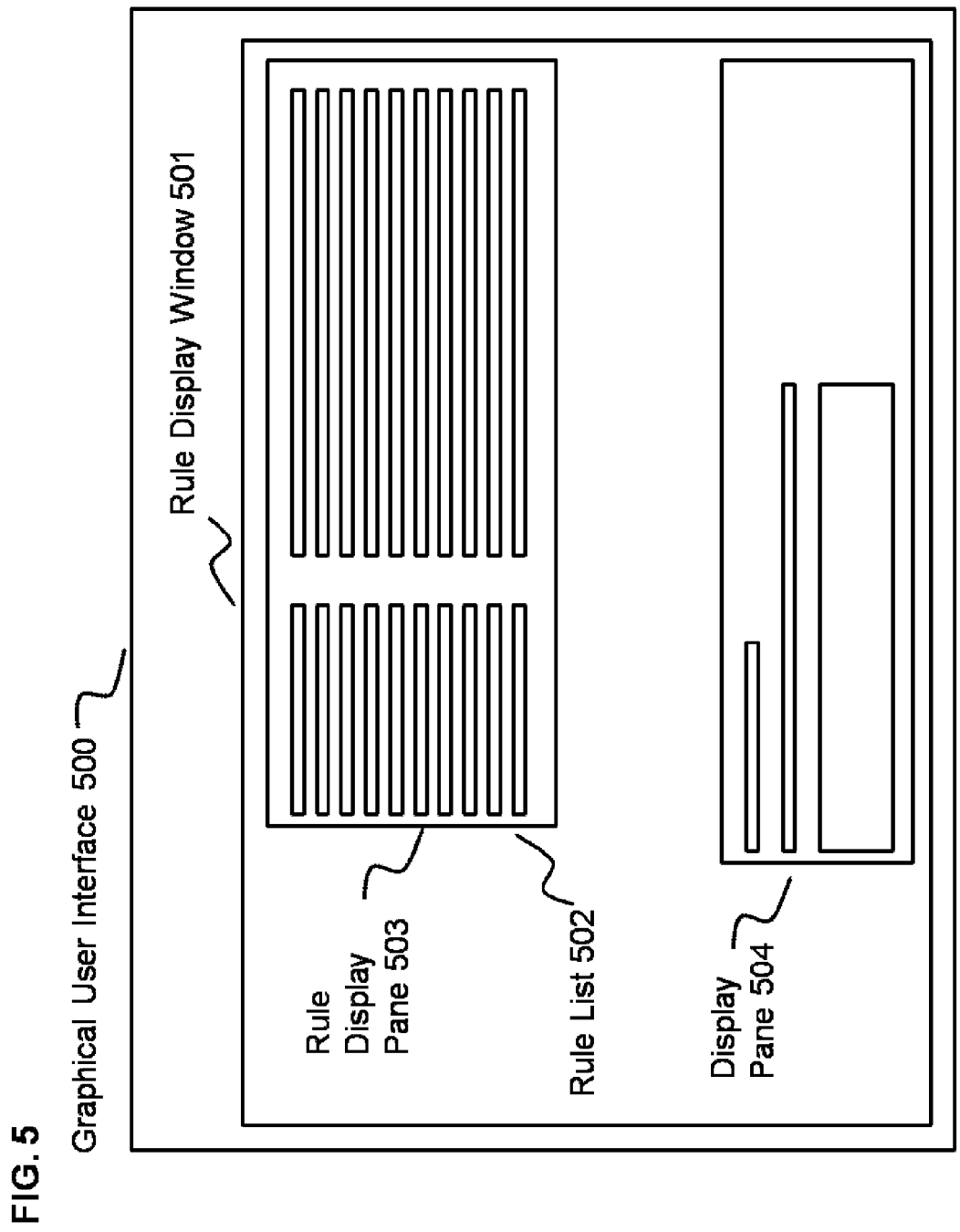
FIG. 5 illustrates a graphical user interface rule display in accordance with various embodiments of the invention.

FIG. 5 displays an example of an output display of a GUI 500 in accordance with various embodiments of the invention. GUI 500 is capable of displaying information to and receiving information from a user. Display window 501 is capable of enabling both business and technical users to understand, modify, and manage discovered rules by reporting key information such as connections between rules, conflicts between rules, and percentage of data covered by each rule. Rule display pane 503 is capable of displaying a summary of each rule as well as important statistics of the rule. Rule list 502 is capable of displaying the rules in an organized and modifiable format with a summary of the statistics of each rule displayed alongside. Details pane 504 is capable of displaying more in-depth information regarding a selected rule.

It is noted that the GUI 500 may not include all of the elements illustrated by FIG. 5. Moreover, the GUI 500 can be implemented to include one or more elements not illustrated by FIG. 5. It is pointed out that the GUI 500 can be utilized or implemented in any manner similar to that described herein, but is not limited to such.

Various embodiments of the invention as described above can significantly accelerate data quality efforts on enterprise initiatives ranging from master data management to business intelligence by significantly reducing the amount of manual effort required to identify and collect data quality rules. In addition, the fact that they can be integrated with key data quality vendor solutions assures that the data quality rules can quickly be made operational for these solutions. It is noted that they can effectively detect and validate data quality problems beyond addresses, names, null values, and value ranges.

Various configurations of the previously described system may be used in place of, or in addition to, the configurations presented herein. For example, although the system was discussed as if its components were serially connected, the components could be linked by a separate data bus or through any number of other configurations. Various embodiments of the invention are not limited to use with finite data sets but instead a constantly changing data set can be used to train the rules. A set of rules can likewise be continuously updated while on-line.

Figure 6:
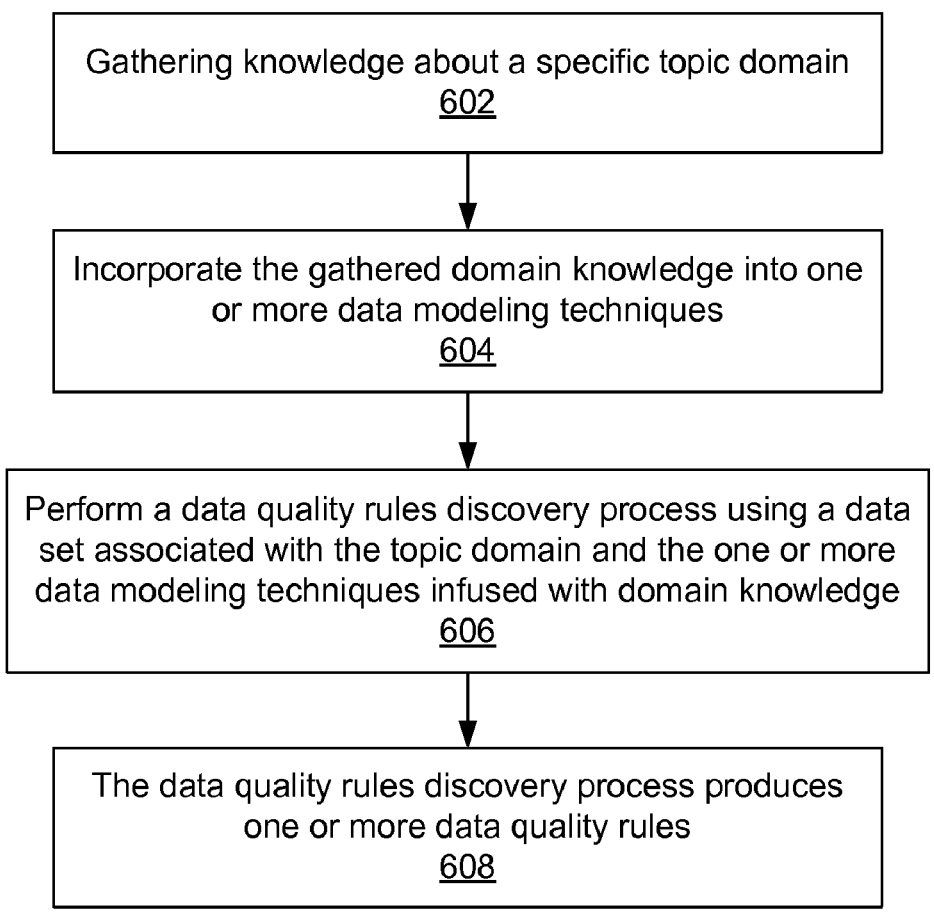
FIG. 6 is a flow diagram of another method in accordance with various embodiments of the invention.

FIG. 6 is a flow diagram of a method 600 in accordance with various embodiments of the invention for extending data quality rules discovery for a data set of a topic domain. Although specific operations are disclosed in flow diagram 600, such operations are examples. Method 600 may not include all of the operations illustrated by FIG. 6. Also, method 600 may include various other operations and/or variations of the operations shown by FIG. 6. Likewise, the sequence of the operations of flow diagram 600 can be modified. It is appreciated that not all of the operations in flow diagram 600 may be performed. In various embodiments, one or more of the operations of method 600 can be performed by software, by firmware, by hardware or by any combination thereof, but is not limited to such. Method 600 can include processes of embodiments of the invention which can be carried out by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

In various embodiments, method 600 can involve a specific topic domain, such as, an electrical utility smart grid domain or a health care domain. While specific smart grid domain examples or health care domain examples are described in combination with method 600, it is noted that method 600 is in no way limited to these specific topic domains. The method 600 can be implemented with a wide variety of different topic domains.

In one embodiment, method 600 can extend the data quality rules discovery methods described herein with domain specific innovations for electricity utilities smart grid domain. Various embodiments of method 600 can reduce manual effort in collecting data quality rules in the electricity smart grid context. In addition, method 600 can also uncover disparities in the data between designs and models of an electrical grid and the actual grid state detected by its smart grid assets. In an embodiment, method 600 can be realized through using the core data quality rules discovery methods described herein combined with additional smart grid specific semantic data model extensions. For example, utility specific metadata can be encoded in the semantic data model of method 600 that guides the rules discovery and prioritization process.

Method 600 can include gathering knowledge about a specific topic domain. The gathered domain knowledge can be incorporated into one or more data modeling techniques. A data quality rules discovery process can be performed utilizing a data set associated with the topic domain and the one or more data modeling techniques that are infused with the domain knowledge. The data quality rules discovery process can produce or discover one or more data quality rules. In this manner, data quality rules discovery can be extended for a data set of a topic domain in accordance with an embodiment of the invention.

Figure 7:
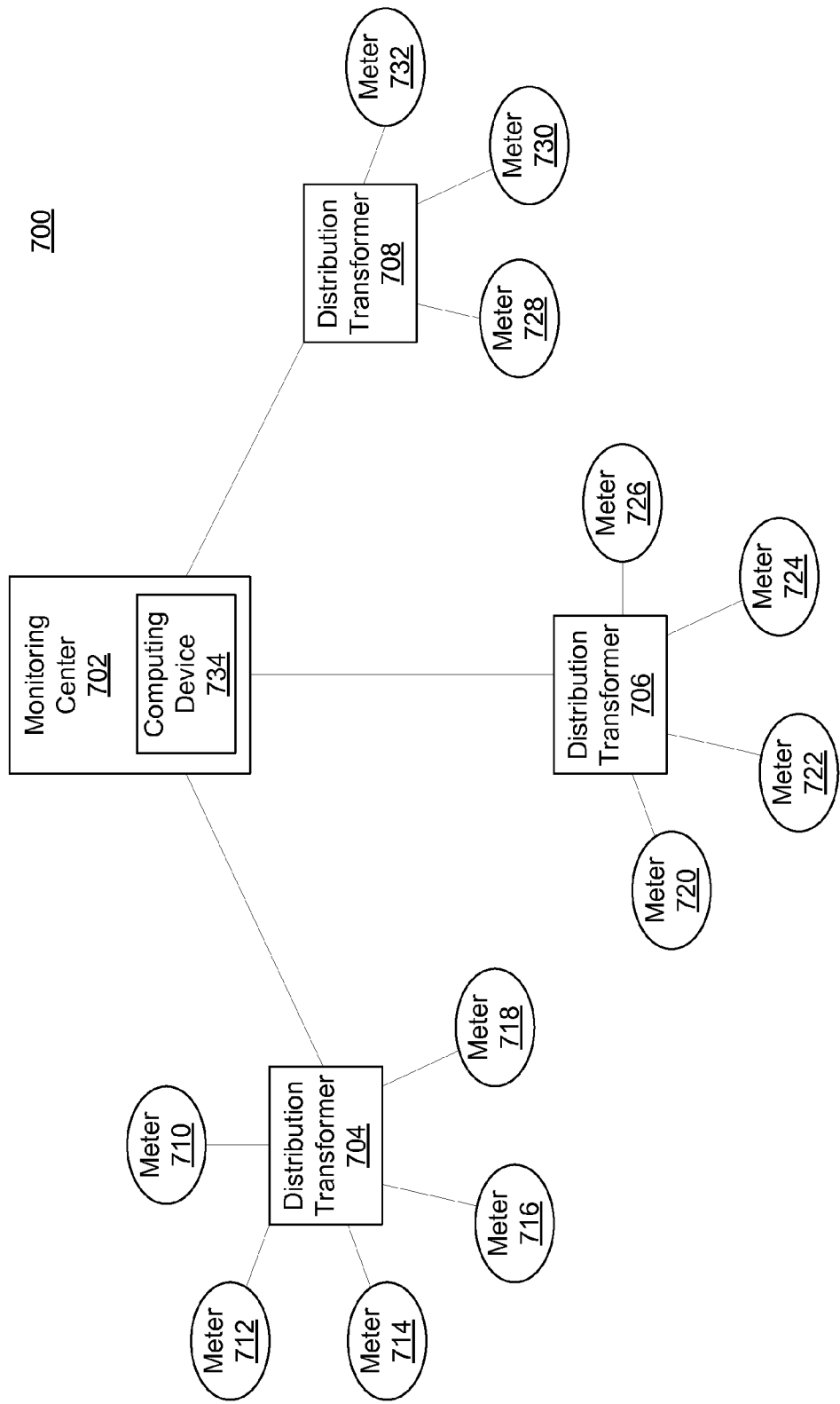
FIG. 7 is a block diagram of an electrical utility smart grid domain in accordance with various embodiments of the invention.

At operation 602 of FIG. 6, knowledge and/or information can be gathered or retrieved about at least one specific topic domain. It is noted that operation 602 can be implemented in a wide variety of ways. For example in one embodiment, FIG. 7 is a block diagram of an electricity utility smart grid domain 700 about which knowledge and/or information can be gathered or retrieved at operation 602. It is noted that the knowledge and/or information about the electricity utility smart grid domain 700 that can be gathered or retrieved at operation 602 can include, but is not limited to, the specific location of each apparatus or element of the electricity utility smart grid domain 700, any relationships that exist within the electricity utility smart grid domain 700, any valid ranges of relationships that exist within the electricity utility smart grid domain 700, any valid operating ranges that exist within the electricity utility smart grid domain 700, any data process dependencies that exist within the electricity utility smart grid domain 700, any time sensitive data relationships that exist within the electricity utility smart grid domain 700, and/or any knowledge or information that enables a transformation of a data set associated with the electricity utility smart grid domain 700. It is noted that in one embodiment, the correct mapping of the relationship between each electricity distribution transformer within the electricity utility smart grid domain 700 and the electricity meters it feeds represents a one-to-many hierarchical relationship that enables key analytics with high business value.

It is noted that the electrical utility smart grid domain 700 can include, but is not limited to, a smart gird monitoring center 702, electricity distribution transformers 704, 706, and 708, electricity meters 710, 712, 714, 716, 718, 720, 722, 724, 726, 728, 730, and 732, and a computing device 734 that can be implemented as part of the smart grid monitoring center 702. In one embodiment, each of the electricity meters 710-732 and each of the electricity distribution transformers 704-708 can include at least one sensor that collects and transmits data related to the functionality of its corresponding device to the computing device 734 of the smart grid monitoring center 702. In this manner, the smart grid monitoring center 702 can monitor each of the electricity distribution transformers 704-708 along with each of the electricity meters 710-732. As such, the computing device 734 of the smart grid monitoring center 702 can detect and/or gather data and information about the electricity utility smart grid domain 700.

Within the electricity utility smart grid domain 700 of FIG. 7, each of the electricity meters 710, 712, 714, 716, and 718 can be coupled to the electricity distribution transformer 704 while each of the electricity meters 720, 722, 724, and 726 can be coupled to the electricity distribution transformer 706. Furthermore, each of the electricity meters 728, 730, and 732 can be coupled to the electricity distribution transformer 708. In one embodiment, the number of electricity meters fed by a distribution transformer is a function of the specifications of the transformer, and the loads of the residences served by the electricity meters. In addition, each of the electricity distribution transformers 704, 706, and 708 can be coupled to the smart grid monitoring center 702 and the computing device 734. Note that each of the electricity distribution transformers 704, 706, and 708 can be coupled to any number of electricity meters, and are not in anyway limited to the number shown. Additionally, the electricity utility smart grid domain 700 can be implemented to include any number of electricity distribution transformers, and is not in anyway limited to the number shown. In an embodiment, the computing device 734 can be implemented with one or more computing devices associated with the smart grid monitoring center 702. It is noted that the electricity utility smart grid domain 700 may not include all of the elements illustrated by FIG. 7. Additionally, the electricity utility smart grid domain 700 can be implemented to include one or more elements not illustrated by FIG. 7. It is pointed out that the electricity utility smart grid domain 700 can be utilized or implemented in any manner similar to that described herein, but is not limited to such.

Figure 8:
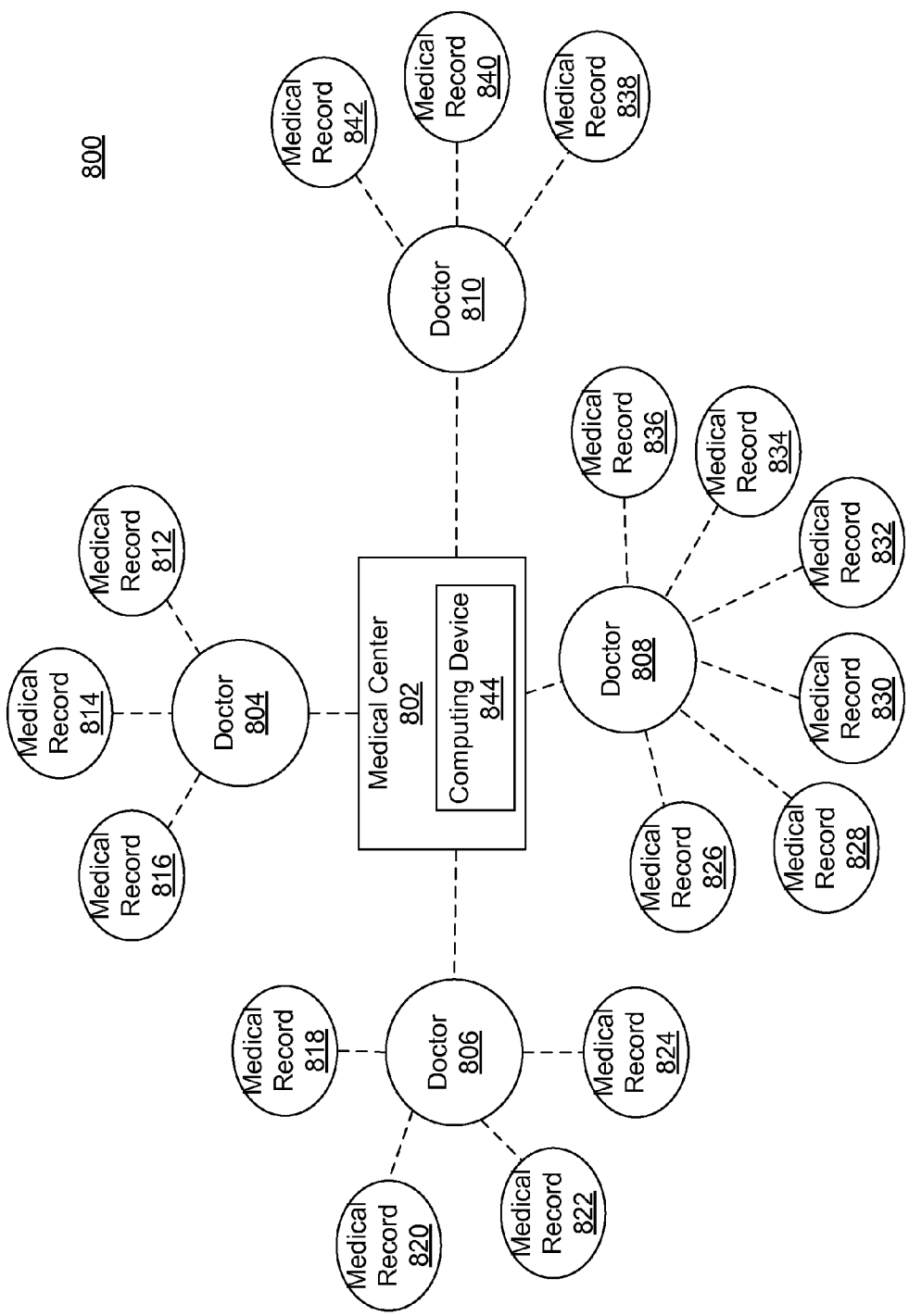
FIG. 8 is a block diagram of a health care domain in accordance with various embodiments of the invention.

As previously mentioned, operation 602 of FIG. 6 can be implemented in a wide variety of ways. For example in an embodiment, FIG. 8 is a block diagram of a health care domain 800 about which knowledge and/or information can be gathered or retrieved at operation 602. It is pointed out that the knowledge and/or information about the health care domain 800 that can be gathered or retrieved at operation 602 can include, but is not limited to, any relationships that exist within the health care domain 800, any valid ranges of relationships within the health care domain 800, time sensitive data relationships within the health care domain 800, and/or any knowledge or information that enables a transformation of a data set associated with the health care domain 800.

The health care domain 800 can include, but is not limited to, a medical center 802, doctors or physicians 804, 806, 808, and 810, patient or client medical records 812, 814, 816, 818, 820, 822, 824, 826, 828, 830, 832, 834, 836, 838, 840, and 842, and computing device 844 that can be implemented as part of the medical center 802. In one embodiment, the patient medical records 812-842 can be implemented as, but are not limited to, software patient medical records that can be stored by the computing device 844. In this manner, the computing device 844 of the medical center 802 can monitor each of the patient medical records 812-842 along with each of the associated doctors 804-810. As such, the computing device 844 of the medical center 802 can detect and/or gather data and information about the health care domain 800.

Within the health care domain 800 of FIG. 8, each of the patient medical records 812, 814, and 816 can be associated with the doctor 804 while each of the patient medical records 818, 820, 822, and 824 can be associated with the doctor 806. Additionally, each of the patient medical records 826, 828, 830, 832, 834, and 836 can be associated with the doctor 808 while each of the patient medical records 838, 840, and 842 can be associated with the doctor 810. Furthermore, each of the doctors 804, 806, 808, and 810 can be associated with the medical center 802 and the computing device 844. Note that each of the doctors 804, 806, 808, and 810 can be associated with any number of patient medical records, and is not in any way limited by the number shown. In addition, the health care domain 800 can be implemented to include any number of doctors, and is not in any way limited by the number shown. In one embodiment, the computing device 844 can be implemented with one or more computing devices associated with the medical center 802. It is pointed out that the health care domain 800 may not include all of the elements illustrated by FIG. 8. Additionally, the health care domain 800 can be implemented to include one or more elements not illustrated by FIG. 8. Note that the health care domain 800 can be utilized or implemented in any manner similar to that described herein, but is not limited to such.

It is pointed out that the specific topic domain at operation 602 of FIG. 6 can include, but is not limited to, one or more electricity utilities smart grid domains (e.g., 700), one or more health care domains (e.g., 800), and the like. In various embodiments, the knowledge and/or information at operation 602 can include, but is not limited to, relationships that exist within the specific topic domain, valid ranges of relationships within the topic domain, time sensitive data relationships within the topic domain, and/or any knowledge or information that enables a transformation of a data set associated with the topic domain. Note that operation 602 can be implemented in any manner similar to that described herein, but is not limited to such.

At operation 604 of FIG. 6, the gathered domain knowledge and/or information can be encoded (or incorporated or infused) into one or more data modeling techniques which strive to accurately describe or depict the specific topic domain (e.g., the electricity utilities smart grid domain 700 or the health care domain 800). It is noted that operation 604 can be implemented in a wide variety of ways. For example in various embodiments, the one or more data modeling techniques at operation 604 can include, but not limited to, one or more semantic data models which strive to accurately describe or portray the specific topic domain. It is pointed out that operation 604 can be implemented in any manner similar to that described herein, but is not limited to such.

At operation 606, a data quality rules discovery process can be performed utilizing a data set associated with the topic domain (e.g., the electricity utility smart grid domain 700 or the health care domain 800) and the one or more data modeling techniques that are encoded or incorporated with the domain knowledge. It is pointed out that operation 606 can be implemented in a wide variety of ways. For example in one embodiment, the data quality rules discovery process at operation 606 can be implemented as, but is not limited to, the method 205 as described herein with reference to FIG. 2. Note that operation 606 can be implemented in any manner similar to that described herein, but is not limited to such.

At operation 608 of FIG. 6, the data quality rules discovery process can produce or generate one or more data quality rules associated with the topic domain. It is noted that operation 608 can be implemented in a wide variety of ways. For example in various embodiments, the one or more data quality rules that can be produced or generated at operation 608 can include, but are not limited to, the one or more data quality rules produced or generated by the method 205 as described herein with reference to FIG. 2. It is pointed out that operation 608 can be implemented in any manner similar to that described herein, but is not limited to such. Once operation 608 is completed, process 600 can be exited. In this fashion, method 600 can extend data quality rules (or more complex structure rules) discovery for a data set of a topic domain in accordance with various embodiments of the invention.

Figure 9:
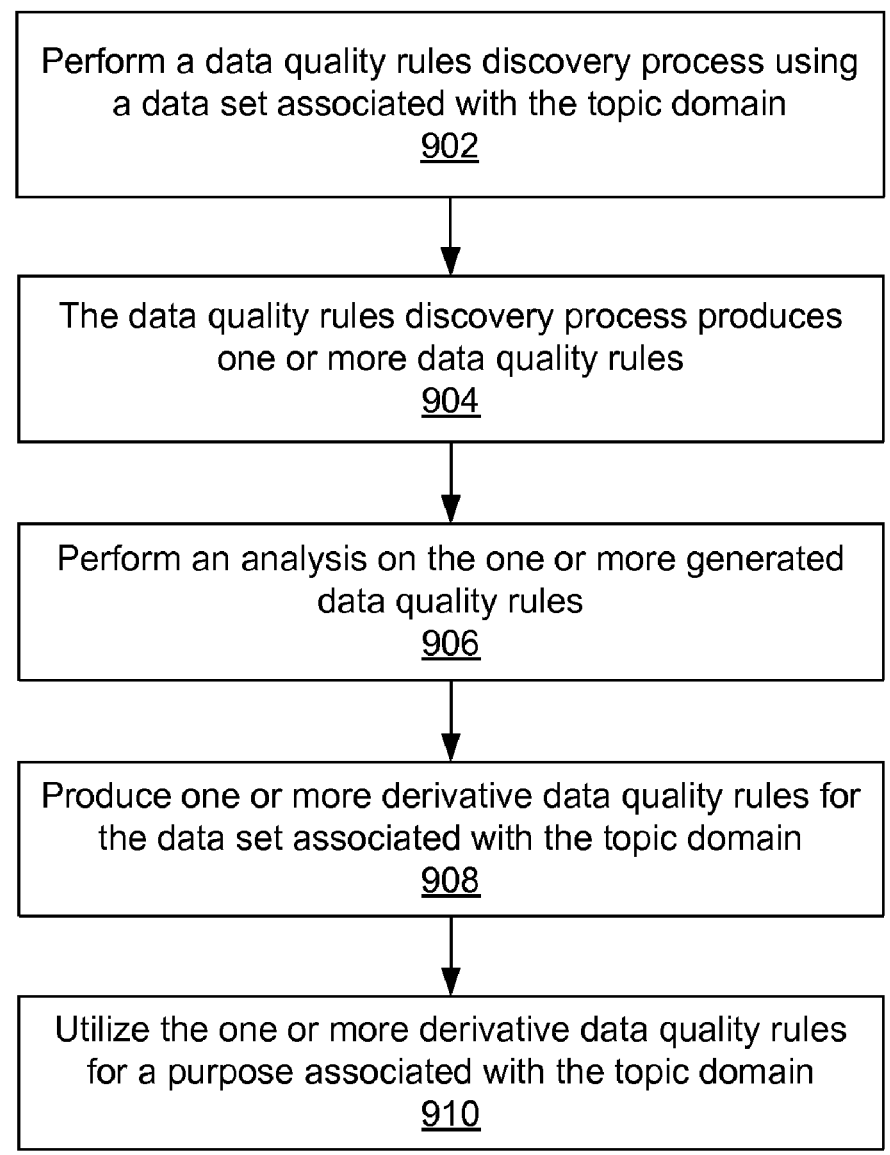
FIG. 9 is a flow diagram of yet another method in accordance with various embodiments of the invention.

FIG. 9 is a flow diagram of a method 900 in accordance with various embodiments of the invention for producing derivative data quality rules for a data set of a topic domain. Although specific operations are disclosed in flow diagram 900, such operations are examples. Method 900 may not include all of the operations illustrated by FIG. 9. Also, method 900 may include various other operations and/or variations of the operations shown by FIG. 9. Likewise, the sequence of the operations of flow diagram 900 can be modified. It is appreciated that not all of the operations in flow diagram 900 may be performed. In various embodiments, one or more of the operations of method 900 can be performed by software, by firmware, by hardware or by any combination thereof, but is not limited to such. Method 900 can include processes of embodiments of the invention which can be carried out by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

In various embodiments, method 900 can involve a specific topic domain, such as, an electrical utility smart grid domain or a health care domain. While specific smart grid domain examples or health care domain examples are described in combination with method 900, it is noted that method 900 is in no way limited to these specific topic domains. The method 900 can be implemented with a wide variety of different topic domains.

Within various embodiments of method 900, special rule structures can be included in the search space related to smart grid applications, such as but not limited to, operating parameter data, time sensitive data relationships, and data or process dependency relationships which can guide the discovery of second-order/derivative rules for the smart grid. In addition, method 900 can also uncover disparities in the data between designs and models of an electrical grid and the actual grid state detected by its smart grid assets. Moreover, within one embodiment of method 900, aggregate analysis and parsing of detected rules can be used to model or verify the smart grid topology based on the actual state of the smart grid.

Method 900 can include performing a data quality rules discovery process utilizing a data set associated with the topic domain and the one or more data modeling techniques. The data quality rules discovery process can produce or discover one or more data quality rules. An analysis can be performed on the one or more generated data quality rules. The analysis can produce or discover one or more derivative data quality rules for the data set associated with the topic domain. In this manner, derivative data quality rules can be produced or discovered for a data set of a topic domain in accordance with an embodiment of the invention.

At operation 902 of FIG. 9, a data quality rules discovery process can be performed utilizing a data set associated with the topic domain (e.g., the electricity utility smart grid domain 700 or the health care domain 800) and one or more data modeling techniques. Note that operation 902 can be implemented in a wide variety of ways. For example in one embodiment, the data quality rules discovery process at operation 902 can be implemented as, but is not limited to, the method 205 as described herein with reference to FIG. 2. It is pointed out that operation 902 can be implemented in any manner similar to that described herein, but is not limited to such.

At operation 904, the data quality rules discovery process can produce or generate one or more data quality rules associated with the topic domain. It is noted that operation 904 can be implemented in a wide variety of ways. For example in various embodiments, the one or more data quality rules that can be produced or generated at operation 904 can include, but are not limited to, the one or more data quality rules produced or generated by the method 205 as described herein with reference to FIG. 2. It is pointed out that operation 904 can be implemented in any manner similar to that described herein, but is not limited to such.

At operation 906 of FIG. 9, an analysis can be performed on the one or more generated data quality rules associated with the topic domain. Note that operation 906 can be implemented in a wide variety of ways. For example in various embodiments, the analysis at operation 906 can include, but is not limited to, aggregating any of the generated data quality rules associated with the topic domain, and/or performing any additional transformations on the one or more generated data quality rules associated with the topic domain. In one embodiment, operation 906 can be implemented utilizing one or more data modeling techniques (e.g., one or more semantic data models), but is not limited to such. It is noted that operation 906 can be implemented in any manner similar to that described herein, but is not limited to such.

At operation 908, the analysis may produce or generate one or more derivative data quality rules (or more complex structure rules) for the data set associated with the topic domain. It is pointed out that operation 908 can be implemented in a wide variety of ways. For example in one embodiment, the one or more derivative data quality rules for the data set associated with the topic domain can be output at operation 908 as part of a GUI to a display device. Note that operation 908 can be implemented in any manner similar to that described herein, but is not limited to such.

At operation 910 of FIG. 9, the generated one or more derivative data quality rules (or more complex structure rules) may be utilized for a purpose associated with the topic domain. It is noted that operation 910 can be implemented in a wide variety of ways. For example, the generated one or more derivative data quality rules (or more complex structure rules) may be utilized at operation 910 for, but not limited to, creating a topology that describes what the topic domain looks like, comparing the design view topology of the topic domain with the data defined and/or rule defined topology of the topic domain, comparing the design view topology of the topic domain with the detected topology of the topic domain, detecting problems within the topic domain data set (e.g., identifying any electricity distribution transformer that has too many electricity meters coupled to it) that may not have been evident from the raw data itself, producing a more comprehensive view of the topic domain, and/or parsing of the one or more generated data quality rules to model or verify the topic domain based on the actual state of the topic domain. In one embodiment, operation 910 can be implemented utilizing one or more data modeling techniques (e.g., one or more semantic data models), but is not limited to such. Note that operation 910 can be implemented in any manner similar to that described herein, but is not limited to such. Once operation 910 is completed, process 900 can be exited. In this fashion, method 900 can produce derivative data quality rules (or more complex structure rules) for a data set of a topic domain in accordance with various embodiments of the invention.

Figure 10:
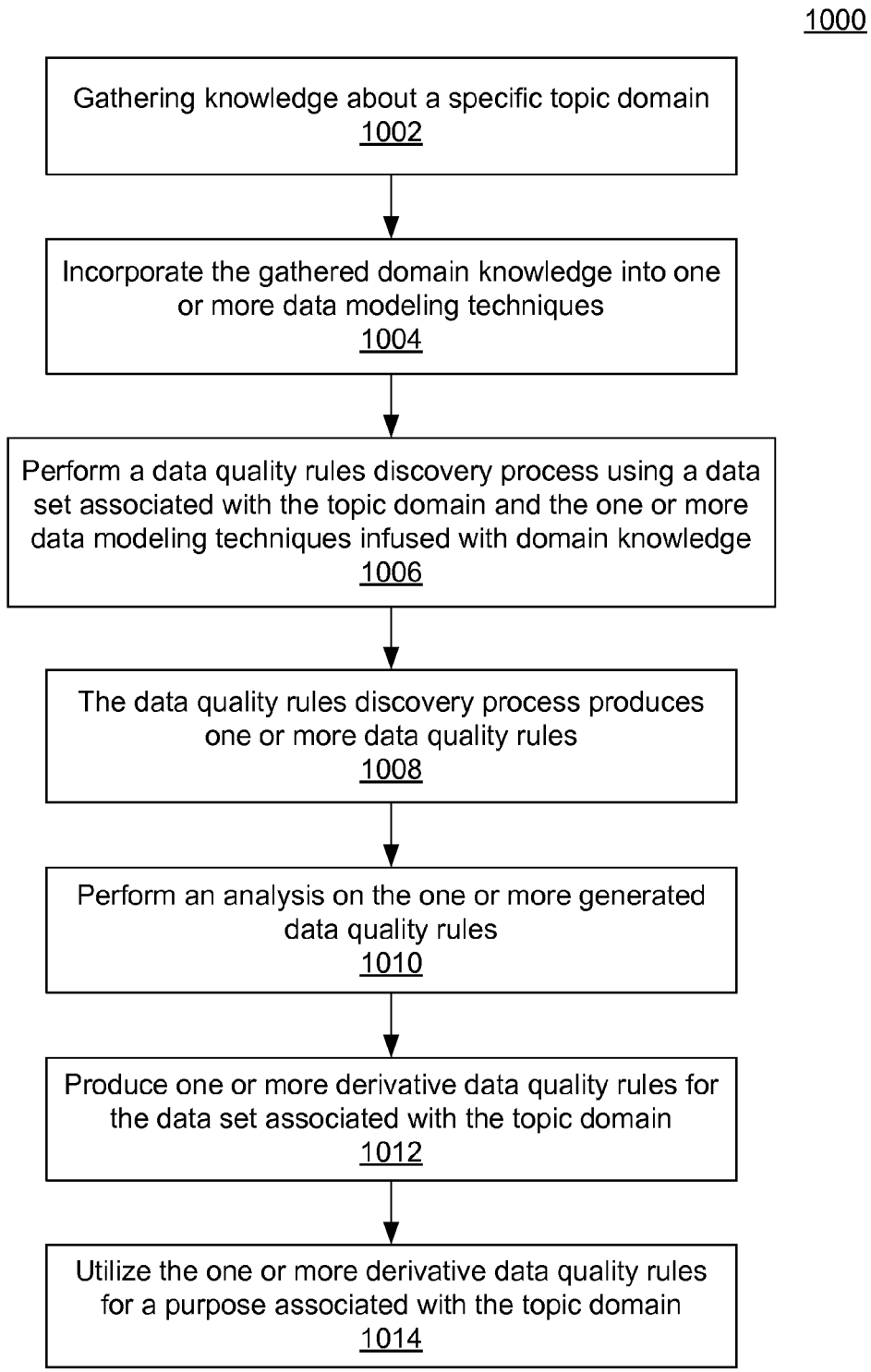
FIG. 10 is a flow diagram of still another method in accordance with various embodiments of the invention.

FIG. 10 is a flow diagram of a method 1000 in accordance with various embodiments of the invention for producing derivative data quality rules for a data set of a topic domain. Although specific operations are disclosed in flow diagram 1000, such operations are examples. Method 1000 may not include all of the operations illustrated by FIG. 10. Also, method 1000 may include various other operations and/or variations of the operations shown by FIG. 10. Likewise, the sequence of the operations of flow diagram 1000 can be modified. It is appreciated that not all of the operations in flow diagram 1000 may be performed. In various embodiments, one or more of the operations of method 1000 can be performed by software, by firmware, by hardware or by any combination thereof, but is not limited to such. Method 1000 can include processes of embodiments of the invention which can be carried out by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

In various embodiments, method 1000 can involve a specific topic domain, such as, the electrical utility smart grid domain or a health care domain. While specific smart grid domain examples or health care domain examples are described in combination with method 1000, it is noted that method 1000 is in no way limited to this specific topic domain. The method 1000 can be implemented with a wide variety of different topic domains.

In one embodiment, method 1000 can extend the data quality rules discovery methods described herein with domain specific innovations for electricity utilities smart grid domain. Various embodiments of method 1000 can reduce manual effort in collecting data quality rules in the electricity smart grid context. Furthermore, method 1000 can also uncover disparities in the data between designs and models of an electrical grid and the actual grid state detected by its smart grid assets. In one embodiment, method 1000 can be realized through using the core data quality rules discovery methods described herein combined with additional smart grid specific semantic data model extensions. For example, utility specific metadata can be encoded in the semantic data model of method 1000 that guides the rules discovery and prioritization process. Additionally, special rule structures can be included in the search space related to smart grid applications, such as but not limited to, operating parameter data, time sensitive data relationships, and data or process dependency relationships which can guide the discovery of second-order/derivative rules for the smart grid. In addition, within one embodiment of method 1000, aggregate analysis and parsing of detected rules can be used to model or verify the smart grid topology based on the actual state of the smart grid.

Method 1000 can include gathering knowledge about a specific topic domain. The gathered domain knowledge can be incorporated into one or more data modeling techniques. A data quality rules discovery process can be performed utilizing a data set associated with the topic domain and the one or more data modeling techniques that are infused with the domain knowledge. The data quality rules discovery process can produce or discover one or more data quality rules. An analysis can be performed on the one or more generated data quality rules. The analysis can produce or discover one or more derivative data quality rules for the data set associated with the topic domain. In this manner, derivative data quality rules can be produced or discovered for a data set of a topic domain in accordance with an embodiment of the invention.

At operation 1002 of FIG. 10, knowledge and/or information can be gathered or retrieved about at least one specific topic domain. It is pointed out that operation 1002 can be implemented in a wide variety of ways. For example in one embodiment, knowledge and/or information can be gathered or retrieved at operation 1002 about the electricity utility smart grid domain 700 of FIG. 7. It is noted that the knowledge and/or information about the electricity utility smart grid domain 700 that can be gathered or retrieved at operation 1002 can include, but is not limited to, the specific location of each apparatus or element of the electricity utility smart grid domain 700, any relationships that exist within the electricity utility smart grid domain 700, any valid ranges of relationships that exist within the electricity utility smart grid domain 700, any valid operating ranges that exist within the electricity utility smart grid domain 700, any data process dependencies that exist within the electricity utility smart grid domain 700, any time sensitive data relationships that exist within the electricity utility smart grid domain 700, and/or any knowledge or information that enables a transformation of a data set associated with the electricity utility smart grid domain 700. Note that in one embodiment, the correct mapping of the relationship between each electricity distribution transformer within the electricity utility smart grid domain 700 and the electricity meters it feeds represents a one-to-many hierarchical relationship that enables key analytics with high business value.

As previously mentioned, operation 1002 of FIG. 10 can be implemented in a wide variety of ways. For example in an embodiment, knowledge and/or information can be gathered or retrieved at operation 1002 about the health care domain 800 of FIG. 8. Note that the knowledge and/or information about the health care domain 800 that can be gathered or retrieved at operation 1002 can include, but is not limited to, any relationships that exist within the health care domain 800, any valid ranges of relationships within the health care domain 800, time sensitive data relationships within the health care domain 800, and/or any knowledge or information that enables a transformation of a data set associated with the health care domain 800.

It is pointed out that the specific topic domain at operation 1002 of FIG. 10 can include, but is not limited to, one or more electricity utilities smart grid domains (e.g., 700), one or more health care domains (e.g., 800), and the like. In various embodiments, the knowledge and/or information at operation 1002 can include, but is not limited to, relationships that exist within the specific topic domain, valid ranges of relationships within the topic domain, time sensitive data relationships within the topic domain, and/or any knowledge or information that enables a transformation of a data set associated with the topic domain. It is noted that operation 1002 can be implemented in any manner similar to that described herein, but is not limited to such.

At operation 1004 of FIG. 10, the gathered domain knowledge and/or information can be encoded (or incorporated or infused) into one or more data modeling techniques which strive to accurately describe or depict the specific topic domain (e.g., the electricity utilities smart grid domain 700 or the health care domain 800). Note that operation 1004 can be implemented in a wide variety of ways. For example in various embodiments, the one or more data modeling techniques at operation 1004 can include, but not limited to, one or more semantic data models which strive to accurately describe or portray the specific topic domain. It is pointed out that operation 1004 can be implemented in any manner similar to that described herein, but is not limited to such.

At operation 1006, a data quality rules discovery process can be performed utilizing a data set associated with the topic domain (e.g., the electricity utility smart grid domain 700 or the health care domain 800) and the one or more data modeling techniques that are encoded or incorporated with the domain knowledge. Note that operation 1006 can be implemented in a wide variety of ways. For example in one embodiment, the data quality rules discovery process at operation 1006 can be implemented as, but is not limited to, the method 205 as described herein with reference to FIG. 2. It is pointed out that operation 1006 can be implemented in any manner similar to that described herein, but is not limited to such.

At operation 1008 of FIG. 10, the data quality rules discovery process can produce or generate one or more data quality rules associated with the topic domain. Note that operation 1008 can be implemented in a wide variety of ways. For example in various embodiments, the one or more data quality rules that can be produced or generated at operation 1008 can include, but are not limited to, the one or more data quality rules produced or generated by the method 205 as described herein with reference to FIG. 2. Operation 1008 can be implemented in any manner similar to that described herein, but is not limited to such.

At operation 1010, an analysis can be performed on the one or more generated data quality rules associated with the topic domain. It is noted that operation 1010 can be implemented in a wide variety of ways. For example in various embodiments, the analysis at operation 1010 can include, but is not limited to, aggregating any of the generated data quality rules associated with the topic domain, and/or performing any additional transformations on the one or more generated data quality rules associated with the topic domain. In an embodiment, operation 1010 can be implemented utilizing one or more data modeling techniques (e.g., one or more semantic data models), but is not limited to such. Operation 1010 can be implemented in any manner similar to that described herein, but is not limited to such.

At operation 1012 of FIG. 10, the analysis may produce or generate one or more derivative data quality rules (or more complex structure rules) for the data set associated with the topic domain. Operation 1012 can be implemented in a wide variety of ways. For example in an embodiment, the one or more derivative data quality rules for the data set associated with the topic domain can be output at operation 1012 as part of a GUI to a display device. Operation 1012 can be implemented in any manner similar to that described herein, but is not limited to such.

At operation 1014, the generated one or more derivative data quality rules (or more complex structure rules) may be utilized for a purpose associated with the topic domain. Operation 1014 can be implemented in a wide variety of ways. For example, the generated one or more derivative data quality rules (or more complex structure rules) may be utilized at operation 1014 for, but not limited to, creating a topology that describes what the topic domain looks like, comparing the design view topology of the topic domain with the data defined and/or rule defined topology of the topic domain, comparing the design view topology of the topic domain with the detected topology of the topic domain, detecting problems within the topic domain data set (e.g., identifying any electricity distribution transformer that has too many electricity meters coupled to it) that may not have be evident from the raw data itself, producing a more comprehensive view of the topic domain, and/or parsing of the one or more generated data quality rules to model or verify the topic domain based on the actual state of the topic domain. In an embodiment, operation 1014 can be implemented utilizing one or more data modeling techniques (e.g., one or more semantic data models), but is not limited to such. Operation 1014 can be implemented in any manner similar to that described herein, but is not limited to such. Once operation 1014 is completed, process 1000 can be exited. In this manner, method 1000 can produce derivative data quality rules (or more complex structure rules) for a data set of a topic domain in accordance with various embodiments of the invention.

Figure 11:
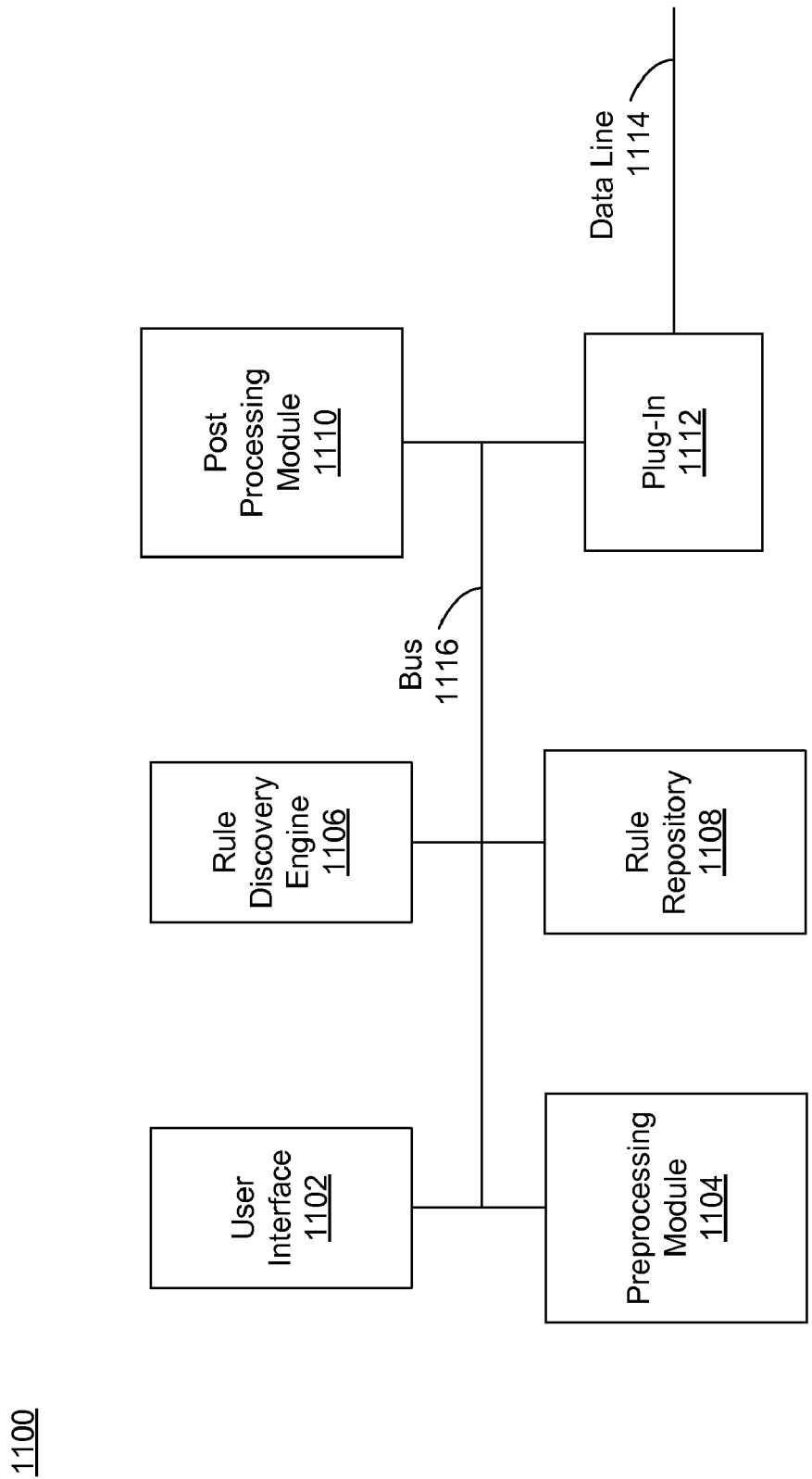
FIG. 11 is a block diagram of a system for producing derivative data quality rules for a data set of a topic domain in accordance with various embodiments of the invention.

FIG. 11 displays a computer system or computing device 1100 for producing derivative data quality rules for at least one topic domain in accordance with various embodiments of the invention. The computer system 1100 can include, but is not limited to, a user interface 1102, a preprocessing module 1104, a rule discovery engine 1106, a rule repository 1108, a post processing module 1110, a plug-in 1112, and a communication bus 1116. Specifically in one embodiment, the user interface 1102 can be implemented as a GUI, but is not limited to such. Furthermore, the user interface 1102 is capable of receiving knowledge and/or information about at least one specific topic domain, receiving rule generation parameters, an address of a data set of the topic domain, an address of related data sets of the topic domain, and/or an address of an ontology from a user, but is not limited to such. Moreover, the user interface 1102 is capable of outputting the derivative data quality rules (or more complex structure rules) that are discovered by the data quality rules discovery engine 1106 and/or the derivative data quality rules (or more complex structure rules) that are generated by the post processing module 1110.

The preprocessing module 1104 is capable of receiving the knowledge and/or information about at least one specific topic domain from the user interface 1102. In addition, the preprocessing module 1104 is capable of encoding one or more data modeling techniques with the domain knowledge and/or information. The rule discovery engine 1106 is capable of receiving the one or more data modeling techniques encoded with the domain knowledge and/or information from the preprocessing module 1104. Furthermore, the rule discovery engine 1106 is capable of receiving from the user interface 1102 the rule generation parameters, the address of the data set of the topic domain, the address of related data sets of the topic domain, and/or the address of an ontology from a user, but is not limited to such.

Within FIG. 11, the rule repository 1108 is capable of receiving and storing the derivative data quality rules (or more complex structure rules) that are discovered by the data quality rules discovery engine 1106 and/or the derivative data quality rules (or more complex structure rules) that are generated by the post processing module 1110. In one embodiment, the rule repository 1108 is capable of delivering the derivative data quality rules (or more complex structure rules) to a plug in data-exchanger such as plug-in 1112. Note that the plug-in 1112 can be added to the system 1100 which enables the exporting the derivative data quality rules (or more complex structure rules) to another system in a compatible fashion. In an embodiment, the plug-in 1112 can be comprised of a set of plug-ins that each assured compatibility with a different external system. Such an embodiment would be desirable because the derivative data quality rules (or more complex structure rules) can then be adapted to be applied to any number of external systems along data line 1114. The external systems capable of receiving the derivative data quality rules (or more complex structure rules) could be a system running a data quality product, an external data base management system, or any other system to which data quality rules may be applied. In particular, the external system could be one running a data quality product such as, but not limited to, TS Discovery, Informatica, Trillium, IDE/IDQ and Oracle Data Integrator.

Within the computer system 1100, the user interface 1102, the preprocessing module 1104, the rule discover engine 1106, the rule repository 1108, and post processing module 1110, and the plug-in 1112 can be coupled to communicate. In one embodiment, the user interface 1102, the preprocessing module 1104, the rule discovery engine 1106, the rule repository 1108, and post processing module 1110, and the plug-in 1112 can each be coupled with a communication bus 1116, but are not limited to such. In addition, the plug-in 1112 can be coupled to the data line 1114. In an embodiment, each of the user interface 1102, the preprocessing module 1104, the rule discovery engine 1106, the rule repository 1108, and post processing module 1110, and the plug-in 1112 can be implemented with software, or hardware, or firmware, of any combination thereof. It is noted that the computer system 1100 may not include all of the elements illustrated by FIG. 11. Furthermore, the computer system 1100 can be implemented to include one or more elements not illustrated by FIG. 11. It is pointed out that the computer system 1100 can be utilized or implemented in any manner similar to that described herein, but is not limited to such.

Various configurations of the previously described system 1100 may be used in place of, or in addition to, the configurations presented herein. For example in various embodiments, the components of system 1100 may be coupled serially, or the components could be linked by a separate data bus or through any number of other configurations. Various embodiments of the invention are not limited to use with finite data sets but instead a constantly changing data set can be used to train the rules. A set of rules can likewise be continuously updated while on-line.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A method comprising:
retrieving data from an electricity smart grid;
encoding said data into a data modeling technique;
performing a data quality rules discovery process using a data set of said electricity smart grid and said data modeling technique encoded with said data to said data set to produce a plurality of data quality rules associated with said electricity smart grid, said data quality rules discovery process comprising:
applying each of a set of candidate conditional functional dependencies to a data segment having a predetermined length of data points of said data set; and
after said applying, if a candidate conditional functional dependency has a result signature that does not meet a predetermined expectation, refining that candidate conditional functional dependency by eliminating an attribute in that candidate conditional functional dependency that took on the most values throughout the data set.

2. The method of claim 1, further comprising:
performing an analysis on said plurality of data quality rules to generate a derivative data quality rule for said data set.

3. The method of claim 2, wherein said performing an analysis comprises aggregating a first data quality rule and a second data quality rule of said plurality of data quality rules.

4. The method of claim 1, wherein said result signature comprises a list of result values.

5. The method of claim 1, wherein said predetermined expectation comprises an estimate of how many different data points a candidate conditional functional dependency would apply to.

6. The method of claim 5, wherein said predetermined expectation further comprises an error estimate of how many different data points would fail a candidate conditional functional dependency.

7. The method of claim 1, wherein said predetermined expectation comprises an error estimate of how man different data points would fail a candidate conditional functional dependency.

8. The method of claim 1, wherein said data comprising a time sensitive data relationship that exists within said electricity smart grid.

9. A method comprising:
retrieving data about a health care domain;
encoding said data into a data modeling technique;
performing a data quality rules discovery process using a data set of said health care domain and said data modeling technique encoded with said data to said data set to produce a plurality of data quality rules for said data set associated with said health care domain, said data quality rules discovery process comprising:
applying each of a set of candidate conditional functional dependencies to a data segment having a predetermined length of data points of said data set; and
after said applying, if a candidate conditional functional dependency has a result signature that does not meet a predetermined expectation, refining that candidate conditional functional dependency by eliminating an attribute in that candidate conditional functional dependency that took on the most values throughout the data set; and
performing an analysis on said plurality of data quality rules to generate a derivative data quality rule for said data set.

10. The method of claim 9, wherein said performing an analysis comprises aggregating a first data quality rule and a second data quality rule of said plurality of data quality rules.

11. The method of claim 9, wherein said performing an analysis comprises performing a transformation on a data quality rule of said plurality of data quality rules.

12. The method of claim 9, wherein said result signature comprises a list of result values.

13. The method of claim 9, wherein said data comprising a time sensitive data relationship that exists within said health care domain.

14. The method of claim 9, wherein said predetermined expectation comprises an estimate of how many different data points a candidate conditional functional dependency would apply to.

15. The method of claim 14, wherein said predetermined expectation further comprises an error estimate of how many different data points would fail a candidate conditional functional dependency.

16. The method of claim 9, wherein said predetermined expectation comprises an error estimate of how may different data points would fail a candidate conditional functional dependency.

17. A system comprising:
an interface capable of receiving data about an electricity smart grid;
a first module coupled to said interface, said first module configured to encode said data into a data modeling technique; and
a discovery engine coupled to said first module, said discovery engine configured to perform a data quality rules discovery process using a data set of said electricity smart grid;
and said data modeling technique encoded with said data to said data set to produce a plurality of data quality rules associated with said electricity smart grid, said data quality rules discovery process comprising:
applying each of a set of candidate conditional functional dependencies to a data segment having a predetermined length of data points of said data set; and
after said applying, if a candidate conditional functional dependency has a result signature that does not meet a predetermined expectation, refining that candidate conditional functional dependency by eliminating an attribute in that candidate conditional functional dependency that took on the most values throughout the data set.

18. The system of claim 17, further comprising:
a second module coupled to receive said plurality of data quality rules, said second module configured to perform an analysis on said plurality of data quality rules to generate a derivative data quality rule for said data set.

19. The system of claim 17, wherein said predetermined expectation comprises an estimate of how many different data points candidate conditional functional dependency would apply to.

20. The system of claim 17, wherein said predetermined expectation comprises an error estimate of how many different data points would fail a candidate conditional functional dependency.

* * * * *